United States Patent
Tao et al.

(10) Patent No.: US 8,639,083 B2
(45) Date of Patent: Jan. 28, 2014

(54) PARENTAL CONTROL FOR HDD TITLE RECORDING

(75) Inventors: Cheng Tao, Singapore (SG); Kwong Heng Kwok, Singapore (SG)

(73) Assignee: Thomson Licensing (FR)

( * ) Notice: Subject to any disclaimer, the term of this patent is extended or adjusted under 35 U.S.C. 154(b) by 588 days.

(21) Appl. No.: 12/387,172

(22) Filed: Apr. 29, 2009

(65) Prior Publication Data

US 2009/0220210 A1    Sep. 3, 2009

(30) Foreign Application Priority Data

Dec. 13, 2007    (EP) .................................... 07301671

(51) Int. Cl.
*H04N 5/765*    (2006.01)
*H04N 5/931*    (2006.01)

(52) U.S. Cl.
USPC ......................................... 386/200; 386/204

(58) Field of Classification Search
None
See application file for complete search history.

(56) References Cited

U.S. PATENT DOCUMENTS

| 6,002,833 | A |   | 12/1999 | Abecassis |
| 6,067,401 | A |   | 5/2000 | Abecassis |
| 6,694,090 | B1 | * | 2/2004 | Lewis et al. .................. 386/261 |
| 2002/0016962 | A1 |   | 2/2002 | Decarmo |
| 2003/0147630 | A1 |   | 8/2003 | Kawai |
| 2003/0188307 | A1 | * | 10/2003 | Mizuno ........................... 725/28 |
| 2004/0240848 | A1 |   | 12/2004 | Seo et al. |
| 2006/0176782 | A1 |   | 8/2006 | Han |
| 2007/0088752 | A1 | * | 4/2007 | Seo et al. .................. 707/104.1 |

FOREIGN PATENT DOCUMENTS

EP    1455359    9/2004
WO    WO01/52532    7/2001

OTHER PUBLICATIONS

European Search Report dated Sep. 6, 2008.

* cited by examiner

*Primary Examiner* — William C Vaughn, Jr.
*Assistant Examiner* — Oluwaseun A Adegeye
(74) *Attorney, Agent, or Firm* — Jack Schwartz and Associates, PLLC

(57) ABSTRACT

The present invention relates to a method for recording a video stream on a recording media, e.g. HDD, wherein the video stream has different parental ratings, and to an apparatus for recording a video stream performing such a method.

5 Claims, 2 Drawing Sheets

PARENTAL CONTROL FOR HDD TITLE RECORDING

FIELD OF THE INVENTION

The present invention relates to a method for recording a video stream on a recording medium, e.g. hard disc drive (HDD), wherein the video stream has different parental ratings, and to an apparatus for recording a video stream performing such a method.

BACKGROUND OF THE INVENTION

It is of strong public concern to protect minors from harmful contents. This is especially true for TV content. Programmes recorded on an optical disc or broadcasted via digital TV, such as according to a DVB standard for example often contain parental rating information. The parental rating corresponds to information for each video programme indicating the acceptability for children of a certain age. This is a recommendation for a minimum age a person should have to watch a programme. Different technologies to identify harmful content in broadcasted programmes are available, e.g. v-chip technology. In many recording and/or reproduction apparatuses a parental level which corresponds to the parental level of the user can be set. The parental level of the user defines movies which are suitable for the user according to their parental ratings. Programmes having parental ratings which are not allowed by the parental level of the recording and/or reproduction apparatus are not recorded and/or reproduced. The change of the parental level of the recording and/or reproduction apparatus is password locked.

With the increased use of recording apparatus for receiving broadcasted TV programmes, for example DVB programmes and for recording them one large media, for example HDD or Blue ray discs, which can store several different programmes having different parental ratings, there is a need to manage such recordings. This is especially true for long recordings wherein several programmes are recorded without making a user action necessary between the single programmes.

EP-A2-1455359 shows a method and apparatus for managing the parental rating information of an optical disc. The method and apparatus allows the user to set and modify a parental rating information during or after a recording is made and to store it on a rewriteable or write-once optical disc. The user does not rely on the rating provided by the programme but can define the parental rating of a movie according to personal beliefs after or during a recording is generated.

SUMMARY OF THE INVENTION

The invention provides a method and an apparatus to generate and manage recordings including several programmes having different parental ratings.

According to an aspect of the invention, the video signal is not provided to a display device if a recording is started by a user that does not have permission to watch it according to the parental level. It is a basic interest of the protection of minors to inhibit children from watching movies which are not suitable for their age. According to a further aspect of the invention, a person whose parental level is not suitable for watching a programme with a certain parental rating still can record the aforesaid programme but is not able to watch it during recording. The screen is for example blue muted or an arbitrary picture is shown like it is known for example from screensavers. If a person is according to his parental level suitable for watching a programme with a certain parental rating, the person is able to record the aforesaid programme and to watch the aforesaid programme during recording. A further advantage of the invention is that in case of a timer recording the video programme is not provided to the display device in case the given parental rating of the video programme is not challenged by the parental level programmed in the recorder. This is also true if the parental rating information of the video stream changes during a timer recording.

A video stream is recorded on a recording medium. The parental rating information of the video stream may change during time of recording. Advantageously, if a change of the parental rating of the video stream is detected, a bookmark is set at this point of the recording. The bookmark contains for example time stamp, title number, chapter number and parental rating. The recording is continued without being interrupted. This has the advantage, that recording of programmes with different parental ratings is possible without making user action necessary. Further, programmes with different parental ratings can be recorded on the same recording medium in an uninterrupted way.

In an advantageous manner, playback is not possible if the parental level of a user is not suitable to access the parental rating and therefore the user does not have the permission to watch a recording or part of it. This has the advantage that playback protection of inhibited video programmes according to the parental rating information is still given. During time shift viewing, when a certain programme is recorded and part of the same recording recorded in the past is played back simultaneously to the recording, the parental rating information of the scenes to be displayed will be used to determine if the scenes are provided to a display device or not.

Advantageously, after a recording is finished, the recording is split into different titles according to the parental rating information. To determine the particular time when the parental rating of a recording changes, the aforesaid bookmarks are used. It is also within the scope of the invention to use other techniques to identify the particular time when the parental rating of a recording changes. For example, a table indicating the times when the parental ratings change is used. After the recording is split into several titles, the parental rating is not changing within one title. It is understood by someone skilled in the art, that each recording containing for example bookmarks or a table indicating changes of the parental rating can be split according to the invention independent of the kind the recording was generated. Advantageously, the step of splitting the recording into different titles according to its parental ratings is also applied to recordings which were recorded by a person who has permission to watch all parts of the recording according to his parental level. In an advantageous manner, the step of splitting the recording into different titles according to their parental ratings is also performed in a method that does not include the step of not providing the video to a display device if a recording is started by a user that does not have permission to watch it according to the parental rating. Advantageously, a recording which contains several parental ratings is prohibited from being copied before it is split into different titles according to the parental rating information as described above.

Advantageously, the method is applied for HDD recordings. HDD recordings are often long hour recordings, in which different programmes are recorded without interruption.

Different programmes may have different parental ratings. User action during the recording is objectionable. The present invention allows to record programmes with changing parental rating information in long hour recordings which is especially useful in the case of HDD recordings.

In an advantageous manner, the video stream is received from a DVB tuner, for example a DVB-T or DVB-S tuner. The parental rating information is obtained from the transport stream. Per scene based parental rating information can be obtained this way. The change of the parental rating is detected immediately and presentation of objectionable content is stopped. No v-chip has to be involved. The overhead included in a DVB video stream containing among others parental rating information has not to be saved in the storage medium. But the parental rating information is according to one aspect of the invention not lost in the recording. The data area of the storage medium can be used more efficiently.

According to a further aspect of the invention, an apparatus for recording a video stream on a recording medium does not provide the video signal to a display device if a recording is started by a user that does not have the permission to watch it according to the parental rating and does record the video stream.

For better understanding the invention shall now be explained in more detail in the following description with reference to the figures. It is understood that the invention is not limited to this exemplary embodiment and that specified features can also expediently be combined and/or modified without departing from the scope of the present invention.

DETAILED DESCRIPTION OF THE PREFERRED EMBODIMENTS

Figure 1:
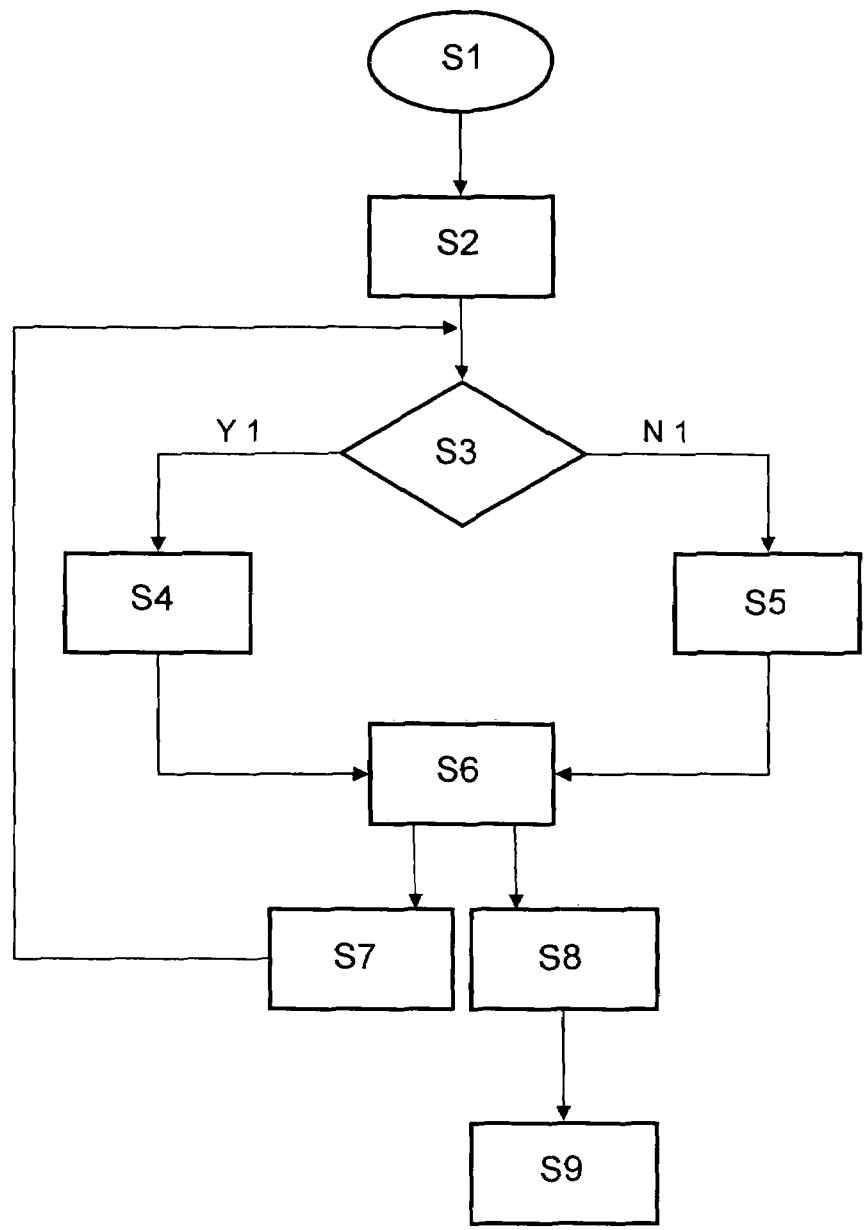
FIG. 1 shows a method for recording according to the invention

FIG. 1 schematically depicts an example of a method for recording according to the invention.
S1 start recording/get parental level of user
S2 get parental rating information
S3 check if user has permission to watch
S4 supply video stream to display device
S5 ban video stream form being played back
S6 record video stream
S7 if parental rating changes, set bookmark to indicate change of parental rating
S8 end recording
S9 split recording into different titles If a recording is started in step S1, the parental level of the user has to be provided. Either the recorder is programmed to a certain parental level or the user has to verify his parental level by entering a password for example. Next, the parental rating of the video stream to be recorded is determined in step S2. According to the parental rating G, PG, R (see FIG. 2 for reference signs) of the video stream and the programmed parental level of the user, it is checked in step S3 if the user has the permission to watch the video stream. If the user has the permission to watch the video stream according to his parental level, the video stream is provided in step S4 to a display device 14 (see FIG. 3 for reference signs). If the user does not have the permission to watch the video stream, the video stream is banned in step S5 from being supplied to the display device 14. In any case, the recording is started in step S6. In case the parental rating information G, PG, R of the video stream changes, a bookmark BK1-BK4 is set in step S7. It is checked in step S3 if the user has the permission to watch the video stream according to the new parental rating G, PG, R. Steps 4 or 5 are repeated like described above. In an exemplary embodiment, if the user does not have the permission to watch the video stream, a password is requested from the user to change the parental level of the player to challenge the new parental rating of the video stream. In any case, the recording is continued in step S6. At the end of the recording, the recording is stopped in step S8. The recording is split in step S9 into different titles t1-t5 according to set bookmarks BK1-BK4, representing the parental ratings G, PG, R of the video stream at certain times.

Figure 2:
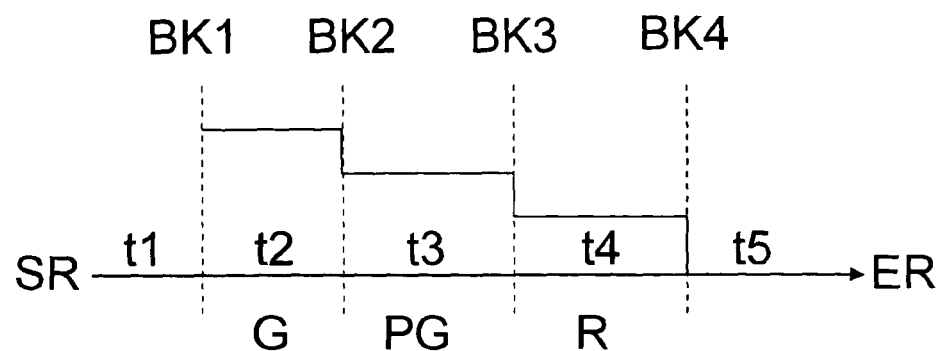
FIG. 2 shows changes of the parental rating information during long hour recording

FIG. 2 schematically depicts an example how parental ratings P, PG, R may change during long hour recording. At the beginning SR of the recording, there is no parental restriction. After a while, the parental rating descriptor which is included in the service information in the DVB stream changes. Parental rating of the following part of the recording will be G. A bookmark BK1 is set at this point during the recording. The recording is not interrupted due to the change of the parental rating descriptor. In case the user does not achieve the changed parental rating, the following part of the programme is not provided to the display device 14. The recording still continues in any case. The parental rating descriptor is changed again from G to PG. This point of the recording is referred to by a further bookmark BK2. Further changes of the parental rating descriptor will be indicated by further bookmarks BK3, BK4 until the recoding is stopped at time ER. The bookmark information, for example time stamp and parental rating information, is accessed by the controller 1 after a recording. The recording is split up into different titles t1-t5. Each title contains only one parental rating. The parental rating information and title name of each title is stored into designated fields of the video files.

Figure 3:
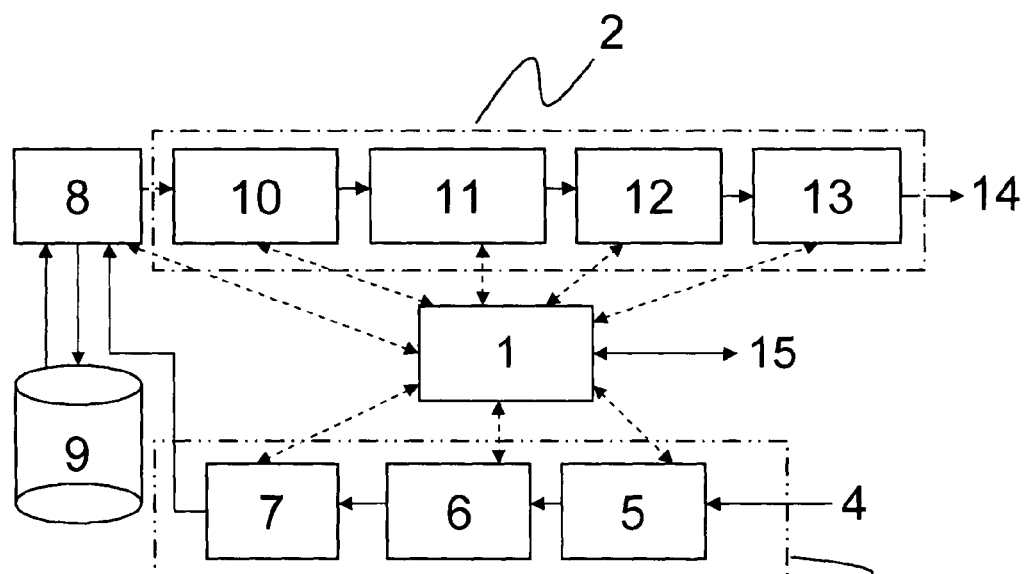
FIG. 3 shows an HDD recording and playback apparatus according to the invention

FIG. 3 depicts an HDD recorder having a recoding side 3 for recording of a DVB-T video stream and a playback side 2 for playback of the recorded video stream, as well as commonly used elements as one or more controllers 1, hard disc drive 8, hard disc 9 and user interface 15 not shown in detail. For recording, a controller 1 receives a recording command from the user interface 15 and the parental level of the user, for example by entering a password to access a certain parental level or the parental level of allowable content is programmed in advance. A DVB-T signal is received from the DVB-T tuner 4. The parental rating descriptor of the programme is also received from the DVB-T tuner 4. The current parental rating information G, PG, R of the received programme is stored in a memory 5 during recording. The parental rating information is passed to the controller 1. If playback during recording is requested by the user, it is checked if the user, according to his parental level and the parental rating of the programme, is suitable to watch the programme. If the user is suitable to watch the programme, the programme is displayed on the screen 14 during recording. If the user is not suitable to watch the programme, the programme is not displayed on the screen 14 during recording. For example, a blue screen, wallpaper or screensaver is shown instead. But the programme is still recorded.

The recoding side 3 includes a memory 5 for storing the parental rating information G, PG, R in a designated field of the video files, a multiplexer 6 for multiplexing video data and a packetizer 7 for packetizing the video data. The files are written to the hard disc 9 by the hard disc drive 8.

The playback side 2 includes a buffer 10 for storing the video data temporarily, a demultiplexer 11 for demultiplexing the video data, an analyser 12 for analysing the parental rating information G, PG, R of the video files and means checking means 13 the parental rating information of the video files with the parental level of the user set in the controller 1. If the user, according to his parental level, is allowed to watch video data according to its parental rating G, PG, R, the video is provided to the display device 14. If the user, according to his parental level, is not allowed to watch video data according to its parental rating G, PG, R, the video is not provided to the display device 14. Alternatively, the controller 1 requests a password on the user interface 15 for changing the parental level of the user temporary or permanently.

What is claimed is:

1. A method for recording a video stream by a recording device on a recording medium, wherein parental ratings of the video stream may change during the recording, the method comprising:
   receiving the video stream,
   checking if the user has permission to watch the video stream according to his parental level,
   banning the video stream from being supplied to a display device upon determining that the user is prohibited from watching the video stream according to his parental level,
   recording the video stream in response to a record command from a user irrespective of whether the user has permission to watch the video stream according to his parental level,
   checking if a parental rating of the video stream changes during recording,
   in case a change of the parental rating of the video stream is detected, setting a bookmark in the recorded video stream at a position of the change of the parental rating information,
   determining whether the user has permission to watch the video stream according to the changed parental rating, and
   splitting the recorded video stream into different titles according to the parental rating information based on the bookmarks in the recorded video stream after the recording of the video stream is finished.

2. The method according to claim 1, further comprising:
   memorizing the most restrictive parental rating that occurs during a single recording, checking the users permissions in case a playback request is received during said single recording, and
   banning playback in case a user is prohibited to watch a recording or part of it according to his parental level.

3. The method according to claim 1, wherein the method is applied for recordings on mass storage devices.

4. The method according to claim 1, wherein the video stream is received from a digital video source.

5. An apparatus for recording a video stream on a recording medium, wherein parental ratings of the video stream may change during the recording, the apparatus comprising:
   a tuner adapted to receive a video stream
   a recorder adapted to record the received video stream on a recording medium irrespective of a parental level of the user requesting recording of the video stream, and
   a controller adapted to perform the steps of:
   checking if the user has permission to watch a video stream according to its parental level,
   banning the video stream from being supplied to a display device in case the user is prohibited from watching the video stream according to his parental level,
   checking if a parental rating of the video stream changes during recording,
   setting a bookmark in the recorded video stream at a position of a change of the parental rating information in case a change of the parental rating information of the video stream is detected,
   determining whether the user has permission to watch the video stream upon detecting a change in the parental rating, and
   splitting the recorded video stream into different titles according to the parental rating information based on the bookmarks in the recorded video stream after the recording of the video stream is finished.

* * * * *